(12) United States Patent
Dan-Jumbo et al.

(10) Patent No.: US 8,617,694 B1
(45) Date of Patent: *Dec. 31, 2013

(54) DISCRETELY TAILORED MULTI-ZONE BONDLINE FOR FAIL-SAFE STRUCTURAL REPAIR

(75) Inventors: Eugene A. Dan-Jumbo, Bothell, WA (US); Russell L Keller, Maple Valley, WA (US); Everett A. Westerman, Auburn, WA (US)

(73) Assignee: The Boeing Company, Chicago, IL (US)

( * ) Notice: Subject to any disclaimer, the term of this patent is extended or adjusted under 35 U.S.C. 154(b) by 310 days.

This patent is subject to a terminal disclaimer.

(21) Appl. No.: 12/903,489

(22) Filed: Oct. 13, 2010

Related U.S. Application Data

(63) Continuation-in-part of application No. 12/400,519, filed on Mar. 9, 2009.

(51) Int. Cl.
| | |
|---|---|
| *B32B 7/02* | (2006.01) |
| *B32B 3/26* | (2006.01) |
| *B32B 3/02* | (2006.01) |
| *G11B 11/05* | (2006.01) |
| *B29C 73/00* | (2006.01) |
| *B32B 43/00* | (2006.01) |

(52) U.S. Cl.
USPC ............ 428/212; 428/63; 428/64.1; 428/214; 428/218; 428/332; 156/94; 156/98

(58) Field of Classification Search
USPC .................. 428/212, 332, 63, 64.1, 214, 218; 156/94, 98
See application file for complete search history.

(56) References Cited

U.S. PATENT DOCUMENTS

| | | |
|---|---|---|
| 3,995,080 A | 11/1976 | Cogburn et al. |
| 4,352,707 A | 10/1982 | Wengler et al. |
| 4,497,404 A | 2/1985 | Lowrance |
| 4,588,626 A | 5/1986 | Cologna |
| 4,808,253 A | 2/1989 | Mimbs |
| 4,820,564 A | 4/1989 | Cologna |
| 4,824,500 A | 4/1989 | White et al. |

(Continued)

FOREIGN PATENT DOCUMENTS

| | | |
|---|---|---|
| EP | 1775445 A2 | 4/2007 |
| EP | 1972429 A2 | 9/2008 |

(Continued)

OTHER PUBLICATIONS

Baker, "Repair Techniques for Composite Structures", Composite Materials in Aircraft Structures, Jan. 1, 1990, pp. 207-227.

(Continued)

*Primary Examiner* — Maria Veronica Ewald
*Assistant Examiner* — Nathan Van Sell
(74) *Attorney, Agent, or Firm* — Yee & Associates, P.C.

(57) ABSTRACT

A repair patch for reworking an inconsistent area of a composite structure includes a patch body adapted to cover the inconsistent area and having a first patch region, a second patch region outside the first patch region and a first separation zone between the first patch region and the second patch region, with the first patch region, the first separation zone and the second patch region having increasing interlaminar fracture toughness from a center to an edge of the patch body; and a layer of adhesive for bonding the patch body to the composite structure.

18 Claims, 10 Drawing Sheets

(56) References Cited

U.S. PATENT DOCUMENTS

| | | | |
|---|---|---|---|
| 4,858,853 A | 8/1989 | Westerman | |
| 4,916,880 A | 4/1990 | Westerman | |
| 4,961,799 A | 10/1990 | Cologna et al. | |
| 4,967,799 A | 11/1990 | Bradshaw | |
| 4,978,404 A | 12/1990 | Westerman, Jr. | |
| 5,023,987 A | 6/1991 | Wuepper et al. | |
| 5,034,254 A | 7/1991 | Cologna | |
| 5,190,611 A | 3/1993 | Cologna et al. | |
| 5,207,541 A | 5/1993 | Westerman et al. | |
| 5,214,307 A | 5/1993 | Davis | |
| 5,232,962 A | 8/1993 | Dershem et al. | |
| 5,344,515 A | 9/1994 | Chenock, Jr. | |
| 5,601,676 A | 2/1997 | Zimmerman et al. | |
| 5,620,768 A | 4/1997 | Hoffmann, Sr. | |
| 5,626,934 A | 5/1997 | Brewer | |
| 5,709,469 A | 1/1998 | White et al. | |
| 5,868,886 A | 2/1999 | Alston et al. | |
| 5,882,756 A | 3/1999 | Alston | |
| 5,993,934 A | 11/1999 | Reese et al. | |
| 6,149,749 A | 11/2000 | McBroom | |
| 6,206,067 B1 | 3/2001 | Kociemba | |
| 6,265,333 B1 * | 7/2001 | Dzenis et al. | 442/346 |
| 6,468,372 B2 | 10/2002 | Kociemba et al. | |
| 6,472,758 B1 | 10/2002 | Glenn et al. | |
| 6,656,299 B1 | 12/2003 | Grosskrueger | |
| 6,680,099 B1 * | 1/2004 | Brewer | 428/63 |
| 6,758,924 B1 | 7/2004 | Guijt | |
| 6,761,783 B2 | 7/2004 | Keller | |
| 7,325,771 B2 | 2/2008 | Stulc et al. | |
| 7,398,698 B2 | 7/2008 | Griess | |
| 7,404,474 B2 | 7/2008 | Yamaki et al. | |
| 7,628,879 B2 | 12/2009 | Ackerman | |
| 7,935,205 B2 | 5/2011 | Bogue et al. | |
| 8,263,212 B2 | 9/2012 | Care | |
| 2001/0008161 A1 | 7/2001 | Kociemba et al. | |
| 2006/0011435 A1 | 1/2006 | Yamaki et al. | |
| 2006/0029807 A1 | 2/2006 | Peck | |
| 2006/0060705 A1 | 3/2006 | Stulc et al. | |
| 2006/0198980 A1 | 9/2006 | Westerdahl | |
| 2006/0243860 A1 | 11/2006 | Kismarton | |
| 2007/0095457 A1 | 5/2007 | Keller et al. | |
| 2007/0100582 A1 | 5/2007 | Griess et al. | |
| 2007/0289692 A1 | 12/2007 | Bogue et al. | |
| 2009/0053406 A1 | 2/2009 | Ackerman | |
| 2010/0047541 A1 | 2/2010 | Care | |
| 2010/0227105 A1 | 9/2010 | Dan-Jumbo et al. | |
| 2010/0227106 A1 | 9/2010 | Dan-Jumbo et al. | |
| 2010/0227117 A1 | 9/2010 | Dan-Jumbo et al. | |
| 2010/0233424 A1 | 9/2010 | Dan-Jumbo et al. | |

FOREIGN PATENT DOCUMENTS

| | | | |
|---|---|---|---|
| WO | 2010104676 A1 | 9/2010 | |
| WO | 2010104741 A1 | 9/2010 | |
| WO | 2010104745 A1 | 9/2010 | |
| WO | 2010104746 A1 | 9/2010 | |

OTHER PUBLICATIONS

Prieto, "Modelling and Analysis of Crack Turning on Aeronautical Structures", Doctoral Thesis, Apr. 2007.

Berthelot, "Composite Materials: Mechanical Behavior and Structural Analysis," (translated by Cole) published by Springer, 1st edition, Dec. 1998, 701 Pages (abstract).

Wang et al., "Optimum Shapes for Minimising Bond Stress in Scarf Repairs," 5th Australian Congress on Applied Mechanics, ACAM 2007, Dec. 2007, 6 Pages.

Gacoin et al., "Comparison between experimental and numerical study of the adhesively bonded scarf joint and double scarf joint: Influence of internal singularity created by geometry of the double scarf joint on the damage evolution," International Journal of Adhesion & Adhesives, vol. 29, Feb. 2009, pp.

Harman et al., "Improved design methods for scarf repairs to highly strained composite aircraft structure," Composite Structures, vol. 75, Issues 1-4, Sep. 2006, pp. 132-144.

Kelly, "Composite Structure Repair," AGARD Report No. 716, 57th Meeting of the Structures and Materials Panel, Oct. 1983, 26 Pages.

USPTO Office Action dated Dec. 22, 2011 for U.S. Appl. No. 12/400,475, 15 pages.

USPTO Office Action dated Jan. 5, 2012 for U.S. Appl. No. 12/400,519, 21 pages.

USPTO Final Office Action dated Dec. 16, 2011 for U.S. Appl. No. 12/401,541, 10 pages.

USPTO Office Action dated Jul. 14, 2011 for U.S. Appl. No. 12/401,541, 13 pages.

USPTO non-final office action dated Feb. 1, 2012 regarding U.S. Appl. No. 12/400,561, 13 Pages.

Tomblin et al., "Assessment of Industry Practices for Aircraft Bonded Joints and Structures," U.S. Department of Transportation, Federal Aviation Administration, DOT/FAA/AR-05/13, Jul. 2005, 245 Pages, accessed May 29, 2012 http://www.tc.faa.gov/its/worldpac/techrpt/ar0513.pdf.

Kan et al., "Advanced Certification Methodology for Composite Structures," U.S. Department of Transportation, Federal Aviation Administration, DOT/FAA/AR-961111, Apr. 1997, 167 Pages, accessed May 29, 2012 http://www.dtic.mil/cgi-bin/GetTRDoc?AD=ADA326762.

"Damage-tolerance evaluation of structure," Federal Aviation Regulations, Part 25, Section 571(e), Apr. 1998, 3 Pages, accessed May 29, 2012 http://www.flightsimaviation.com/data/FARS/part_25-571.html.

PCT Search Report dated May 21, 2010 regarding 08-0999PCT, application No. PCT/US2010/026229, applicant the Boeing Company, 3 Pages.

PCT Search Report dated Jun. 29, 2010 regarding 08-1011, application No. PCT/US2010/026252, applicant the Boeing Company, 3 Pages.

PCT search report dated Jun. 25, 2010 regarding application PCT/US2010/025181, filed Feb. 14, 2010, applicant reference 08-0762PCT, applicant the Boeing Company, 3 Pages.

PCT search report dated Jun. 29, 2010 regarding application PCT/US2010/026256, filing date Mar. 4, 2010, applicant reference 08-1102-PCT, applicant The Boeing Company, 7 Pages.

Dan-Jumbo et al., "Bonded patch Having Multiple Zones of Fractured Toughness," U.S. Appl. No. 12/706,799, filed Feb. 17, 2010, 47 Pages.

Komoroski et al., "Stacking Sequence Effects and Delamination Growth in Graphite/Epoxy Laminates Under Compression-Dominated Fatigue Loading," Composite Materials: Fatigue and Fracture—Fifth Volume, editor Roderick Martin, Oct. 1995, pp. 249-267 (abstract).

Berthelot, "Effect of the Stacking Sequence on Mat and Cloth Reinforcement Materials," In: Composite Materials: Mechanical Behavior and Structural Analysis (Cole, Trans.), Springer Publishing, New York, pp. 312-345, 1998.

Response to Office Action, dated Mar. 21, 2012, regarding U.S. Appl. No. 12/400,475, 22 pages.

USPTO Final Office Action, dated Jun. 7, 2012, regarding U.S. Appl. No. 12/400,475, 14 pages.

Response to Office Action, dated Apr. 5, 2012, regarding U.S. Appl. No. 12/400,519, 41 pages.

USPTO Final Office Action, dated Jun. 7, 2012, regarding U.S. Appl. No. 12/400,519, 14 pages.

Response to Office Action, dated May 1, 2012, regarding U.S. Appl. No. 12/400,561, 29 pages.

USPTO Final Office Action, dated Jul. 5, 2012, regarding U.S. Appl. No. 12/400,561, 15 pages.

Seng, "Laminate Design," In: Handbook of Composites, Second Edition, Peters (Ed.), Chapman & Hall, London, 1998, pp. 686-695.

USPTO Office Action, dated Jul. 24, 2012, regarding U.S. Appl. No. 12/401,541, 18 pages.

Chang et al., "Properties and failure mechanisms of z-pinned laminates in monotonic and cyclic tension," Composites Part A: Applied Science and Manufacturing, vol. 37, No. 10, Oct. 2006, pp. 1501-1513.

(56) References Cited

OTHER PUBLICATIONS

Chang, "A Study on Fracture Toughness of Advanced Structural Composites," Naval Air Development Center Report No. EW-4-73, Jul. 1973, 113 pages.

Mouritz, "Review of z-pinned composite laminates," Composites Part A: Applied Science and Manufacturing, vol. 38, No. 12, Dec. 2007, pp. 2383-2397.

Tomblin et al., "Bonded Repair of Aircraft Composite Sandwich Structures," U.S. Department of Transportation Federal Aviation Administration Final Report No. DOT/FAA/AR-03/74, Feb. 2004, 121 pages.

Office Action dated Jan. 2, 2013, regarding USPTO U.S. Appl. No. 12/706,799, 33 pages Final Office Action, dated Dec. 14, 2012, regarding USPTO U.S. Appl. No. 12/401,541, 13 pages.

Notice of Allowance, dated Feb. 22, 2013, regarding USPTO U.S. Appl. No. 12/400,561, 19 pages.

Notice of allowance dated Oct. 29, 2012 regarding U.S. Appl. No. 12/400,475, 20 pages.

Notice of allowance dated Oct. 18, 2012 regarding U.S. Appl. No. 12/400,519, 20 pages.

* cited by examiner

| Ply # | Third Region | Second Region | First Region |
|---|---|---|---|
| 1 | 0 | 0 | 0 |
| 2 | 90 | 90 | 90/+45 |
| 3 | none | none | -45 |
| 4 | 90 | 0 | 0 |
| 5 | 90 | 0 | 0 |
| 6 | none | none | -45 |
| 7 | 90 | 90 | 90/+45 |
| 8 | 0 | 0 | 0 |

DISCRETELY TAILORED MULTI-ZONE BONDLINE FOR FAIL-SAFE STRUCTURAL REPAIR

CROSS REFERENCE TO RELATED APPLICATIONS

This application is a continuation-in-part of and incorporates by reference in its entirety co-pending U.S. patent application Ser. No. 12/400,519, filed on Mar. 9, 2009, which is related to co-pending U.S. patent application Ser. Nos. 12/400,475, filed on Mar. 9, 2009, 12/400,561, filed on Mar. 9, 2009.

TECHNICAL FIELD

The disclosure generally relates to composite structures. More particularly, the disclosure relates to a discretely-tailored multi-zone bondline for structural repair which includes a combination of a series of multi-zoned structural bonded joint/repair elements and a uniquely-designed, multi-zoned repair patch/doubler and adhesive combination which results in a manageable and predictable life.

BACKGROUND

Composite structures sometimes have localized areas containing one or more inconsistencies that may require rework in order to bring the structure within design tolerances.

In the past, one rework process was performed using a patch that was placed over the inconsistent area and secured to the parent structure using mechanical fasteners. This rework technique was desirable because the condition of the patch could be monitored over time by visually inspecting the fasteners. However, the use of fasteners may increase aircraft weight and/or drag on the aircraft, and may be esthetically undesirable in some applications.

In some applications, rework patches have been secured to a parent structure using a bonded joint, however this technique may also require the use of mechanical fasteners that provide secondary load paths forming an arrestment mechanism to limit the growth of an inconsistency. Furthermore, changes in a bonded joint securing a rework patch on a parent structure may not be easily monitored over time because the attaching mechanism of the joint or joint interface may not be visible.

Currently, a single layer bonded repair of airframe components, particularly those fabricated with advanced composite materials, may not be designed nor certified to truly meet the intent of FAR 25-571e and FAR 26 for the future. Since nothing can be seen visually in regards to the quality defect and strength of the resulting bonded joint/repair, the resulting characteristics of the bond and its life may not be known. A process variation may have occurred in the actual installation that may be detrimental to its performance, ability to transfer load efficiently, and one may not be able to detect that variation. Consequently, confidence in the actual performance of a given bond over its life may be lacking. The strength, durability and damage tolerance of a bonded repair may not be determined non-destructively nor have sufficient process controls been developed or put into place for in-service repairs that ensures its integrity by analysis. Mechanically fastened repairs can be visually inspected and confidence in their integrity is assured based on this visual inspection and fail-safe as well as success over time. This may not be the case with regard to bonded joints/repairs.

Existing solutions to primary structure may avoid the reliance of the bonded joint for fail-safe life as there are no current solutions for certifying bonded joints. To meet the FAR requirements including existing and new, secondary load paths may be used and any bonded joint may have a damage arrestment mechanism such as the use of fasteners in the joint/repair. Bonded repairs that restore structural strength to primary structure may not be performed unless specifically authorized and supervised by an engineering authority as well as performed by highly-trained mechanics in a controlled environment. Current repair manuals for in-service repair may limit their application due to this confidence issue, where structural credit may not be given to the patch.

Accordingly, there is a need for a discretely-tailored multi-zone bondline for structural repair which includes a combination of a series of multi-zoned structural bonded joint/repair elements and a uniquely-designed, multi-zoned repair patch/doubler and adhesive combination which results in a manageable and predictable life.

SUMMARY

The disclosure is generally directed to a repair patch for reworking an inconsistent area of a composite structure. An illustrative embodiment of the repair patch includes a patch body adapted to cover the inconsistent area and having a first patch region, a second patch region outside the first patch region and a first separation zone between the first patch region and the second patch region, with the first patch region, the first separation zone and the second patch region having increasing interlaminar fracture toughness from a center to an edge of the patch body; and a layer of adhesive for bonding the patch body to the composite structure. In some embodiments, the repair patch may include a patch body adapted to cover the inconsistent area and having a first patch region, a first separation zone outside the first patch region, a second patch region outside the first separation zone, a second separation zone outside the second patch region, a third patch region outside the second separation zone and a third separation zone outside the third patch region, with the first patch region, the first separation zone, the second patch region, the second separation zone, the third patch region and the third separation zone having increasing interlaminar fracture toughness from a center to an edge of the patch body; and a layer of adhesive for bonding the patch body to the composite structure.

The disclosure is further generally directed to a method of repairing a repair surface using a repair patch. An illustrative embodiment of the method includes providing a repair patch having a patch body with concentric patch regions and separation zones of increasing interlaminar fracture toughness from a center to an edge of the patch body and an overlay doubler on the patch body; providing a repair surface; and bonding the patch body of the repair patch to the repair surface.

BRIEF DESCRIPTION OF THE ILLUSTRATIONS

DETAILED DESCRIPTION

Figure 1:
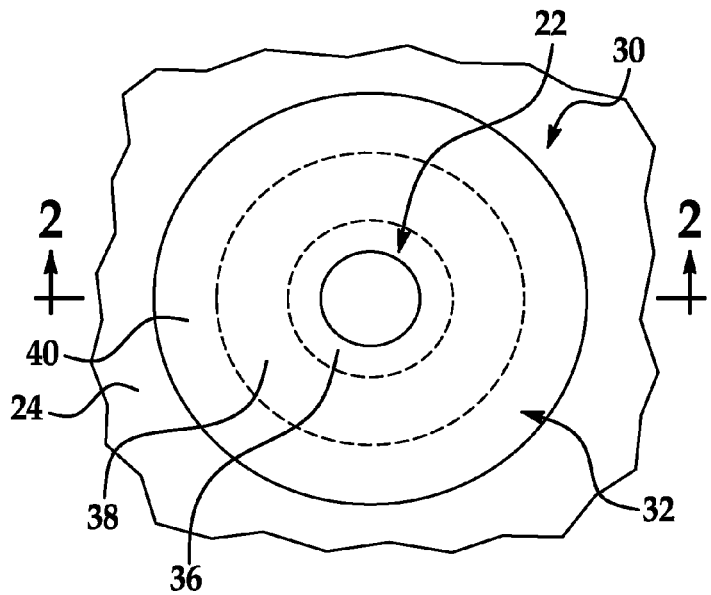
FIG. 1 is an illustration of a bonded rework patch on a composite structure.
Figure 2:
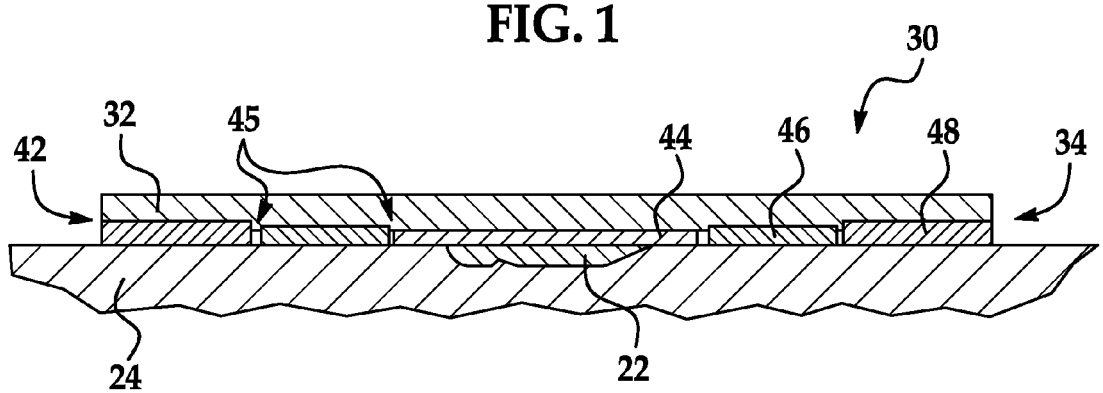
FIG. 2 is an illustration of a sectional view taken along the line 2-2 in FIG. 2.

Referring now to FIGS. 1 and 2, according to the disclosed embodiments, a composite rework patch 30 is used to rework an inconsistent area 22 in a composite structure 24. As used herein, "inconsistent area", "inconsistency" and "inconsistencies" each refer to a localized area in the composite structure 24 that may be outside of designed tolerances. The inconsistency 22 may comprise, for example and without limitation, a void, a dent, or a porosity that may occur at the time that the composite structure 24 is manufactured, or later during the service life of the composite structure 24.

The composite patch 30 comprises a composite laminate patch 32 which overlies the inconsistent area 22 and is bonded to the composite structure 24 by a layer 34 of a structural adhesive forming a bond joint 42. The size of the patch 30 may vary with the application and the dimensions of the inconsistent area 22. The adhesive layer divides the bonded joint 42 and area 22 into first, second and third control regions 36, 38, 40 respectively, that may provide a graceful reduction of transition loads transmitted between the structure 24 and the patch 30. The first control region 36 is centrally located over the inconsistent area 22, and the second and third control regions 46, 48 may respectively comprise a pair of substantially concentric rings surrounding the centrally located first region 36. While the regions 36, 38, 40 are shown as being generally circular in the disclosed embodiment, a variety of other shapes are possible. Also, in other embodiments, the patch 30 may have only two control regions 36, 38, or may have more than three control regions 36, 38, 40.

The first control region 36 may exhibit favorable in-plane adhesive stresses. The second control region 38 may be referred to as a durability region and any disbond within this region between the patch 32 and the parent structure 24 may need to be evaluated and quantified in order to determine whether rework should be performed. The third control region 40, which may be dominated by in-plane shear and peeling moments, may affect the behavior of the entire structural bond between the patch 32 and parent structure 24.

Figure 3:
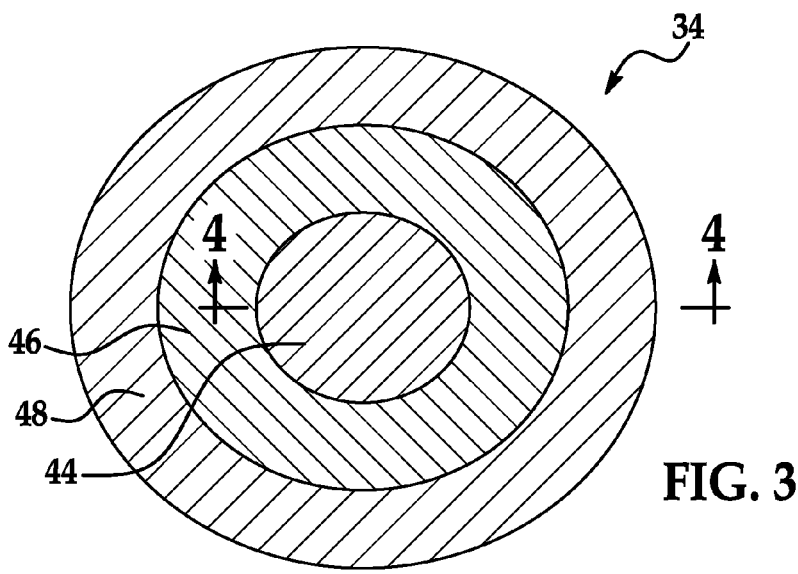
FIG. 3 is an illustration of a plan view of the adhesive layer shown in FIG. 2.
Figure 3A:
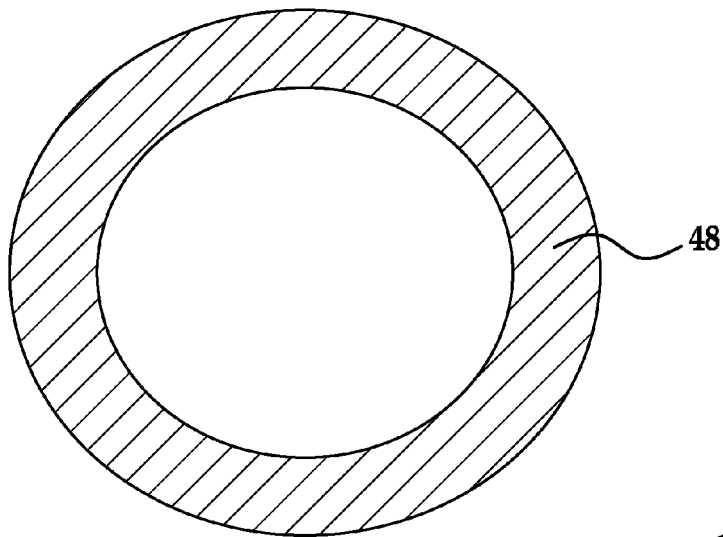
FIGS. 3a-3c are illustrations of plan views respectively of sections of the adhesive layer shown in FIG. 3.
Figure 3B:
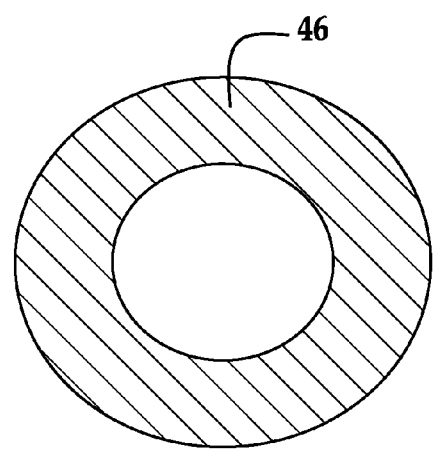
Figure 3C:
Figure 4:
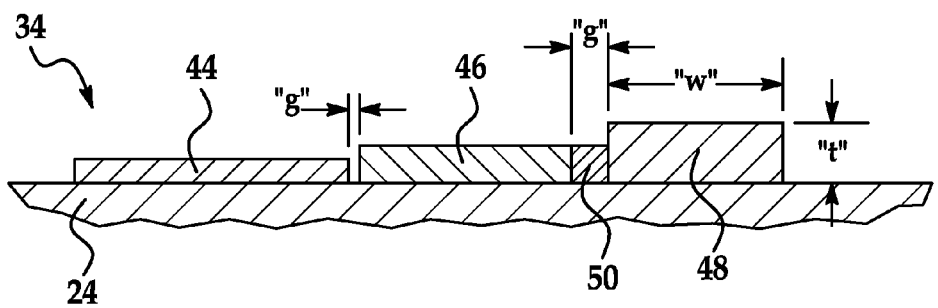
FIG. 4 is an illustration of a sectional view taken along the line 4-4 in FIG. 3.

Referring now particularly to FIGS. 2-4, the adhesive layer 34 may comprise a central section 44 surrounded by concentric ring shaped sections 46 and 48. The size and shape of the adhesive sections 44, 46, 48 generally correspond to the first, second and third control regions 36, 38, 40 respectively of the rework patch 30. Each of the adhesive sections 44, 46, 48 may comprise one or more plies of a commercially available structural adhesive which is generally available in film or sheet form that may be cut to the desired shape. The adhesive sections 44, 46, 48 may also be formed from a commercially available structural adhesive paste. As previously noted, multiple plies (not shown) of the adhesive sheet material may be built up to form a desired thickness "t" for each of the adhesive sections 44, 46, 48. The strength of the bond may be tailored using the thickness "t" between patch 32 and structure 24. In some applications only a single ply of adhesive sheet material may be required, while in other applications, more than one ply may be necessary, depending on the application and the thickness of the adhesive sheet.

In one embodiment, circumferential gaps "g" may be formed between adhesive sections 44, 46, 48 to aid in arresting the growth of potential debonding between the laminate patch 32 and the composite structure 24. A filler 50 may be placed in one or both of the gaps "g" to aid in the arrestment.

The properties of each of the adhesive sections 44, 46, 48 may be tailored in a manner that affects the rate at which first, second and third control regions 36, 38, 40 of the bond joint 42 respectively release strain energy. Tailoring of each of the adhesive sections 44, 46, may be achieved by altering the dimensions of the adhesive sections 44, 46, 48, such as thickness "t" or width "w", or by altering the form of the film, paste, scrim, etc., as well as by altering the structural properties of the adhesive layer, such as fracture toughness, peel or shear properties, or by providing the gap "g" between the adhesive sections 44, 46, 48. Fracture toughness may be described as the general resistance of a material to delaminate. Additionally, a spacer or filler 50 may be interposed between adhesive sections 44, 46, 48 to aid in arresting disbond growth.

The use of the tailored adhesive sections 44, 46, 48 may result in a bonded rework patch 30 that is divided into multiple control regions 36, 38, 40 that respectively release strain energy at different rates. The first, second and third control regions 36, 38, 40 provide for a graceful reduction of transition loads between the patch 32 and the structure 24, which may not only allow prediction of a course of disbond extension, but can allow assessment of the condition of the rework patch 30 through simple visual inspection, or other nondestructive inspection techniques. Although three control regions 36, 38, 40, are shown and discussed, more or less than three control regions may be possible.

The first control region 36 of the patch 30 which overlies the inconsistent area 22 exhibits favorable in-plane stresses that may suppress the stress concentration around the boundary of a disbond of the bonded joint 42. The global adhesive stresses within the first control region 36 may reduce the strain energy release rate necessary for extension of a disbond under maximum load limits applied to the composite structure 24.

The characteristics of the rework patch 30 within the second control region 38 may result in the release of strain energy at a rate greater than that of the first control region 36. Any disbond that may occur in the bond joint 42 within the second control region 38 may be anticipated by a fatigue durability disbond curve (not shown) which defines the work input required to initiate disbond growth. The characteristics of the third control region 40 are selected such that the strain energy release rate within the third control region 40 is greater than that of the second control region 38 to discourage disbond initiation and growth, as well as in-plane shear and peeling moments.

Figure 5:
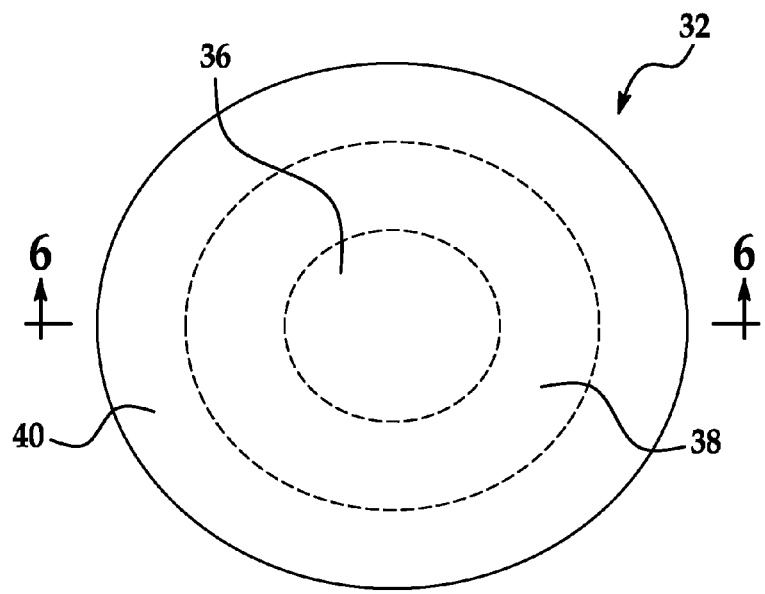
FIG. 5 is an illustration of a plan view of a composite laminate patch forming part of the rework patch shown in FIG. 1.
Figure 6:
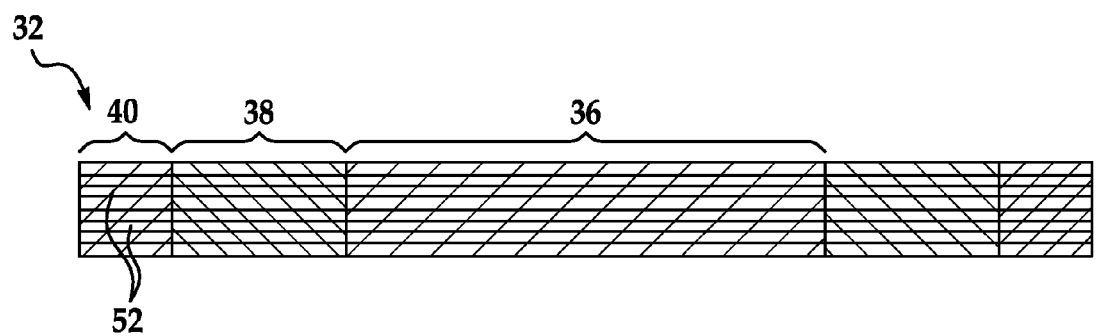
FIG. 6 is an illustration of a sectional view taken along the line 6-6 in FIG. 5.

Attention is now directed to FIGS. 5 and 6 which illustrate a laminated patch 32 comprising multiple plies 52 of fiber reinforced polymer in which the plies 52 may be tailored in order to aid in achieving first, second and third control regions 36, 38, 40 respectively, having the desired strain energy release rates. Strain energy release rate within the laminated patch 32 may be tailored within the control regions 36, 38, 40 by selecting and/or arranging the plies such that the plies in each of the regions 36, 38, 40 have different characteristics. In other words, each of the regions 36, 38, 40 may have ply characteristics that are unique to that region. Thus, for example, the plies in region 38 may have characteristics that are different from those in regions 36 or 40, and the plies in region 36 may have characteristics that are different than those in regions 38 and 40. As used herein, "characteristics" and "ply characteristics" refer to, without limitation: the type, size or quantity of fiber reinforcement in a ply; ply thickness; gaps between the plies; materials, elements or structures placed between the plies; the number of plies; the type or density of matrix used in the ply; the layup orientation (angle) of each ply and/or the sequence of ply orientations in a stack of the plies.

The strain energy release rate within one of more of the control regions 36, 38, 40 may be tailored by forming a scarf or tapered joint (not shown) between the patch 32 and the structure 24. The strain energy release rate may also be tailored by providing gaps (not shown) in certain areas between plies 52 in a manner that may alter the mechanical properties of the laminated patch 32 in each of the control regions 36, 38, 40. Also, it may be possible to employ differing orientation sequences of the plies 52 in order to aid in achieving the defined control regions 36, 38, 40. Orientation refers to the layup angle or direction of reinforcing fibers in a ply, for example and without limitation, 0°, 30°, 60°, 90° and/or 0°, +45°, −45°, 90°.

In the example illustrated in FIGS. 5 and 6, the materials used in the plies 52 and/or the orientation sequences within the first control region 36 result in the highest rate of strain relief, while the selection of these materials and/or ply orientation sequences in second and third control regions 38 and 40 respectively result in intermediate and lowest rates of release of strain energy, respectively. In other embodiments, however, depending on the application, the third control region 40 may possess highest rate of strain energy relief, while the first control region 36 posses the lowest rate of strain energy relief.

Figures 7, 8:
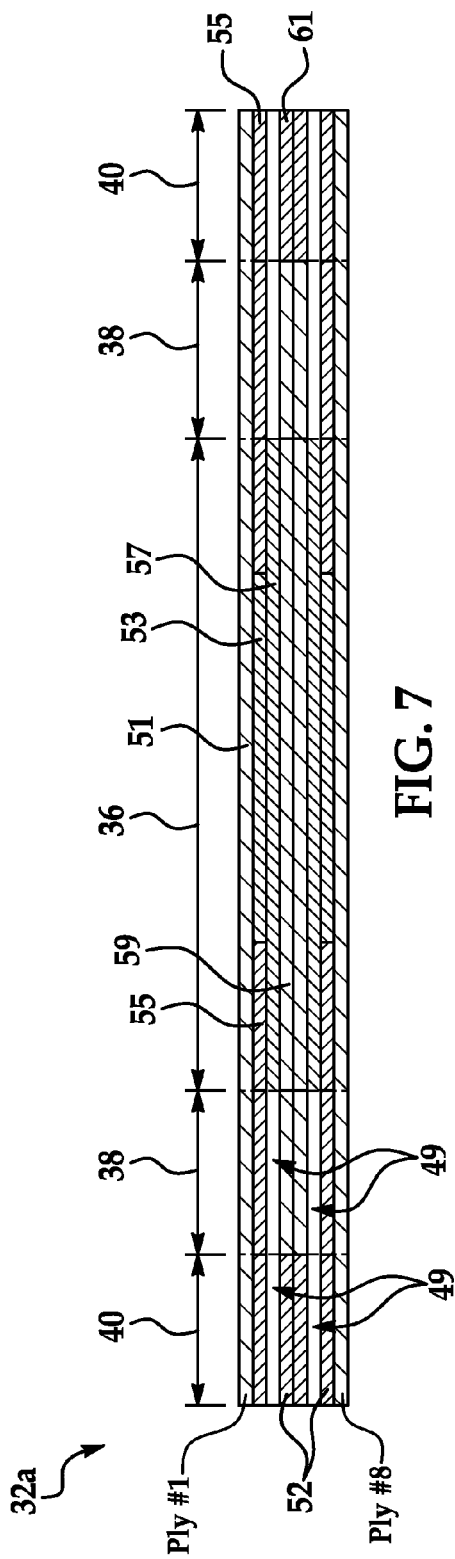
FIG. 7 is an illustration of a sectional view similar to FIG. 6, but showing details of a tailored laminate patch divided into regions having differing interlaminar toughness.
FIG. 8 is an illustration of a table showing a ply schedule for the differing regions of the tailored laminate patch shown in FIG. 7.
Figure 9:
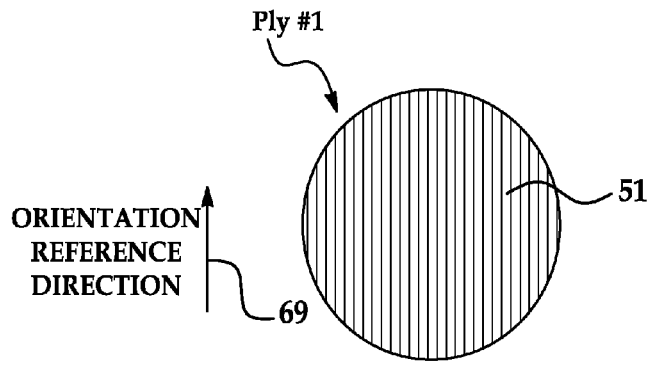
FIGS. 9-12 are illustrations of plan views respectively illustrating plies 1-4 in the laminate patch shown in FIG. 7.
Figure 10:
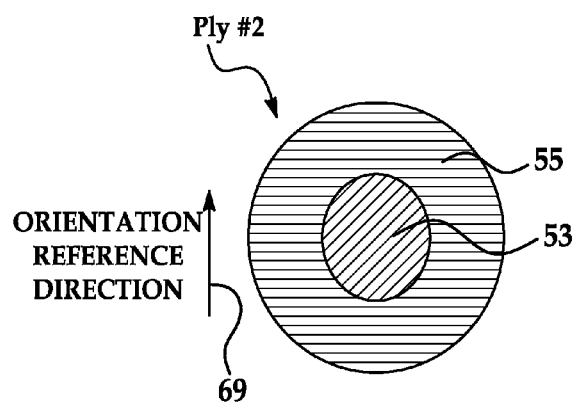
Figure 11:
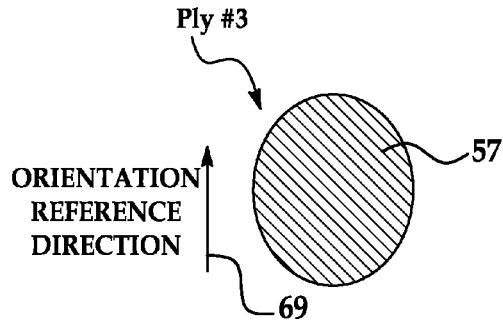
Figure 12:
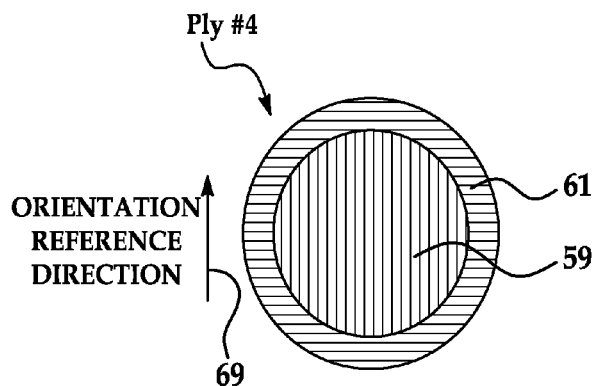

Attention is now directed to FIG. 7 which illustrates a typical tailored laminate patch 32a comprising eight plies 52 of fiber reinforced polymer, before being compacted and cured into a consolidated laminate. When viewed in plan, the shape of the tailored laminate patch 32a, including regions 36, 38, 40, may be substantially the same as that of the patch 32 illustrated in FIG. 5. The plies 52 forming the tailored laminate patch 32a may be referred to as plies #1-#8. FIG. 8 is a table illustrating the ply orientations for the laminate patch 32a within regions 36, 38, 40 for each of the plies #1-#8, while FIGS. 9-12 show the constituent sections of plies 1-4.

As mentioned above in connection with FIGS. 5 and 6, the characteristics of the plies 52 may be different in each of the regions 36, 38, 40. The rate of release of strain energy in regions 36, 38 and 40 is related to the modulus or stiffness that defines the interlaminar toughness of the patch 32a in the respective region 36, 38, 40. In the disclosed embodiment, the first region 36 has the highest interlaminar fracture toughness, while the third region 40 possesses the lowest interlaminar fracture toughness. In one practical application for example, and without limitation, the interlaminar fracture toughness of the third region 40 has an interlaminar fracture toughness that may be between approximately 0.5 and 1.0 in-#/in$^2$, and the second region 38 has an interlaminar fracture toughness that may be between approximately 1.5 and 2.0 in-#/in$^2$. The first region 36 in this example has an interlaminar fracture toughness that may be equal to or greater than approximately 2.5 in-#/in$^2$. In other embodiments, however, the third region 40 may have the highest interlaminar fracture toughness and the first region 36 may have the lowest interlaminar fracture toughness, with the interlaminar fracture toughness of the second region 38 being between that of the first and third regions 36, 40, respectively.

The particular values of the interlaminar fracture toughness for the regions 36, 38, 40 will depend upon the application and the particular mechanical properties of the plies 52 that are present within the regions 36, 38, 40. Moreover, the values for the interlaminar fracture toughness within the regions 36, 38, 40 may be tailored to the properties of the adhesive layer (see FIG. 3), including the sections 44, 46, 48 of the adhesive layer 34 so that the sections 44, 46, 48 of the adhesive layer 34 and the mechanical properties of the laminate patch 32a within regions 36, 38, 40 are suitably matched to provide maximum performance. Although not shown in FIG. 7, the sections 44, 46, 48 of the adhesive layer 34 respectively underlie, and may be substantially coextensive with the regions 36, 38, 40 of the laminate patch 32a.

As previously discussed, the interlaminar fracture toughness within the regions 36, 38, 40 may be controlled by using differing prepreg materials in the plies 52, and/or by overlapping the plies 52 between adjacent ones of the regions 36, 38, 40, and/or by using different ply orientation sequences within each of the regions 36, 38, 40. For example, FIG. 8 illustrates differing ply orientation sequences for plies #1-#8 within each of the regions 36, 38, 40. It can be seen for example, that in comparing the orientation sequence of the plies 52 for the second and third regions, 38, 40 respectively, ply #4 and ply #5 are oriented at 90° in the third region 40, but have a 0° orientation in the second region 38. As previously mentioned, ply orientation refers to the direction of orientation of unidirectional reinforcing fibers held in a polymer matrix, usually a prepreg, which forms each of the plies 52. The sequence of orientations of the plies #1-#8 for the first region 36 is different from the sequence of orientations for either the second or third regions, 38, 40.

Referring now particularly to FIGS. 7 and 9-12, it can be seen that ply #1 comprises a single, circularly shaped section 51 (FIG. 9) having a 0° degree fiber orientation relative to an orientation reference direction 69, which extends across all three regions 36, 38, 40. Ply #2 includes a circular center section 53 (FIG. 10) having a +45° fiber orientation, and an outer, ring shaped section having a 90° orientation. As a result of the configuration of ply #2, region 36 has combined fiber orientations of 90° and +45° degrees, while regions 38 and 40 both have 90° fiber orientations. Ply #3 comprises a single section 57 (FIG. 11) within region 36 having a −45° fiber orientation, while in regions 38 and 40, gaps 49 (FIG. 7) are present. Finally, ply #4 (FIG. 12) comprises a section 59 having a 0° fiber orientation that extends throughout regions 36 and 38. Section 59 is surrounded by a section 61 having a 90° fiber orientation which is confined to the third region 40. Ply #s 5-8 shown in FIG. 7 are essentially a mirror image of ply #s 1-4 described above.

From the forgoing, it can be appreciated that each of the regions 36, 38, 40 possesses a unique interlaminar fracture toughness in the tailored laminate patch 32a, and/or the bond joint 42 (FIG. 2). The interlaminar fracture toughness within the regions 36, 38, 40 of the patch 32a may be tailored to and compliment the global adhesive stresses in the bond joint 42 so as to contain and resist growth of inconsistencies either in the patch 32a or the bond joint 42.

Figure 13:
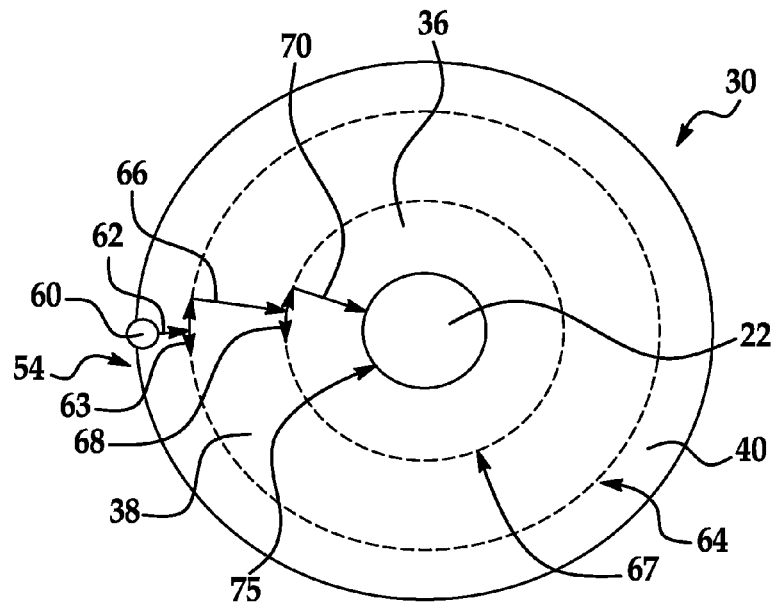
FIG. 13 is an illustration of a plan view of the rework patch shown in FIG. 1, and illustrating a typical propagation path of a debonding.

FIG. 13 illustrates the manner in which a disbond beginning at outer edge 60 of the third control region 40 and growing inwardly, may be arrested. The disbond beginning at edge 60 may be illustrated in this scenario as growing directly inward, as shown at 62 until the boundary 64 is reached between control regions 38 and 40. As a result of the difference in materials in control regions 36, 38, 40, and/or the presence of a gap "g" or filler 50 (FIG. 4), and/or the difference in the adhesive properties of the sections 44, 46, 48 of the adhesive layer (FIG. 2), the disbond is arrested and may move circumferentially around 63 the boundary 64 of the third control region 40. Another scenario may have a disbond progressing from the third region 40 and into the second control region 38, and progressing inwardly toward the first control region 36, as indicated by the numeral 66. When the progression of the disbond reaches the boundary 68 between control regions 36 and 38, it is arrested and may move circumferentially around the boundary 68.

Figure 14:
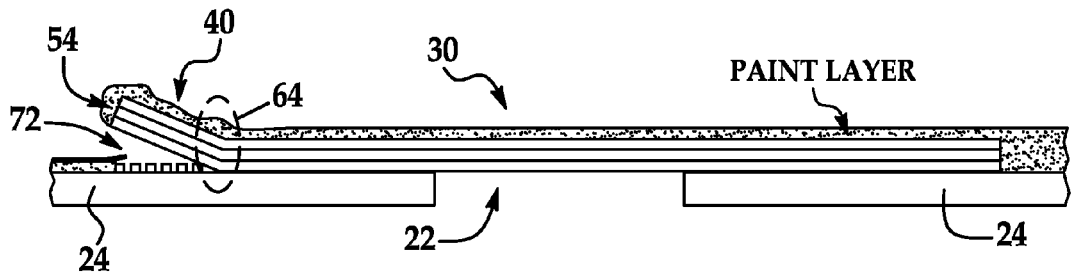
FIGS. 14-16 are illustrations of sectional views showing progression of the debonding through regions of the patch.

Referring concurrently to FIGS. 13 and 14, as the disbond 72 moves inwardly from the beginning point 60, the outer edge 54 of the rework patch may peel upwardly thereby cracking overlying paint (not shown) which provides a visual indication of disbond initiation and/or growth within the third control region 40. This visual indication of a disbond may terminate at the boundary 64 between control regions 38 and 40.

Figure 15:
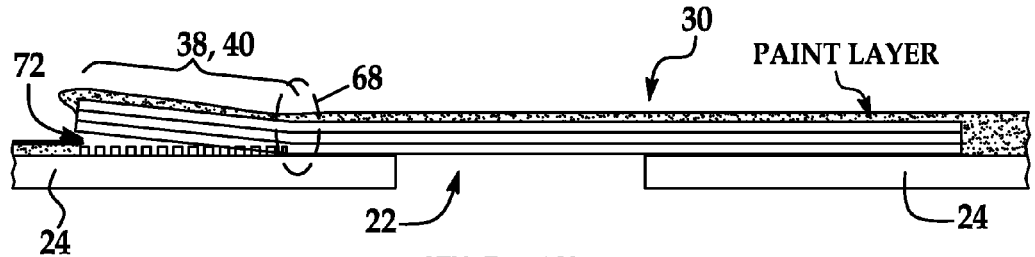
Figure 16:
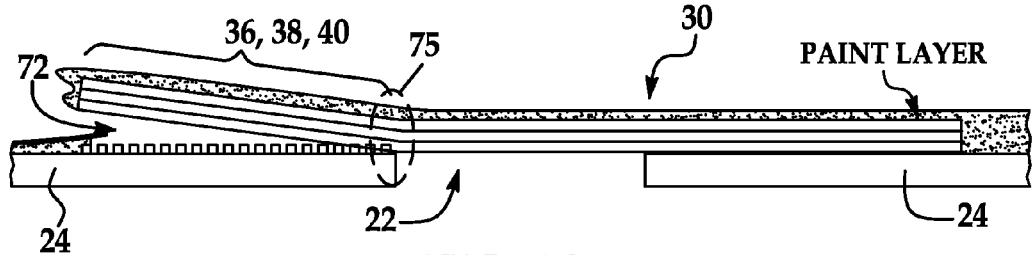

As shown in FIG. 15, if the disbond 72 continues into the second control region 40 toward the boundary 68, the patch 30 in the area of the control regions 38 and 40 may peel upwardly, thereby further cracking overlying paint to provide a visual indication that the disbond has progressed into or through the second control region 40. FIG. 16 illustrates the disbond having progressed up to the boundary 75 of the inconsistency 22. At this point, the areas of the patch 30 and all three control regions 36, 38, 40 may peel upwardly to further crack overlying paint, thereby providing a still more obvious visual indication that the disbond has advanced to a point where the rework patch 30 may need further attention. From the foregoing, it is apparent that the control regions 36, 38, 40 of the rework patch 30 provide a means of allowing nondestructive visual inspection of the condition of the patch 30, including the bond joint 42 between the patch 30 and the structure 24. As previously noted, other non-destructive inspection techniques may be used to assess the condition of the patch 30, instead of, or as a supplement to, visual inspection.

Figure 17:
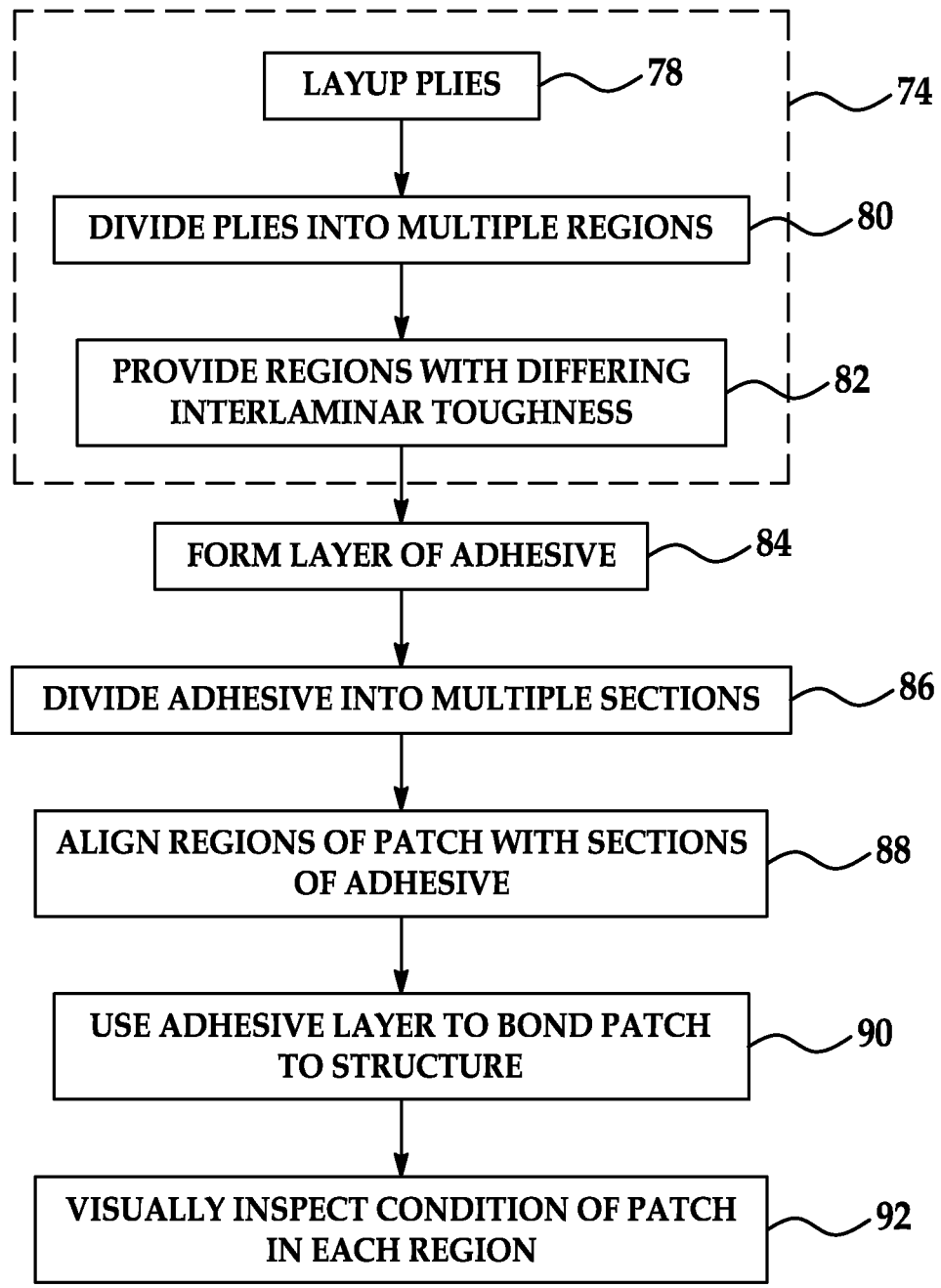
FIG. 17 is an illustration of a flow diagram for a method for reworking an inconsistent area of a composite structure.

Attention is now directed to FIG. 17 which illustrates a method for reworking areas of a composite structure containing inconsistencies using the tailored rework patch 32a discussed above. The tailored patch 32a is formed by a series of steps 74 beginning with laying up plies 78 using a ply schedule and orientation sequence that may be similar to those shown in FIGS. 7 and 8. As shown at 80, the plies 52 are divided into multiple regions 36, 38, 40 as part of the ply layup 78. Also, the regions 36, 38, 40 are provided with differing interlaminar fracture toughness as shown at 82, by using differing materials and/or ply orientations as previously discussed.

At 84, a layer 34 of adhesive is formed, and at 86, the adhesive layer 34 is divided into multiple sections 44, 46, 48. The regions 36, 38, 40 of the tailored patch 32a are then aligned, as shown at step 88, with the sections 44, 46, 48 of the adhesive layer 34. The adhesive layer 34 is used to bond the tailored patch 32a to a composite structure, as shown at step 90. At step 92, the patch may be visually inspected over time to determine the condition of the patch in each of the regions 36, 38, 40.

Figure 17A:
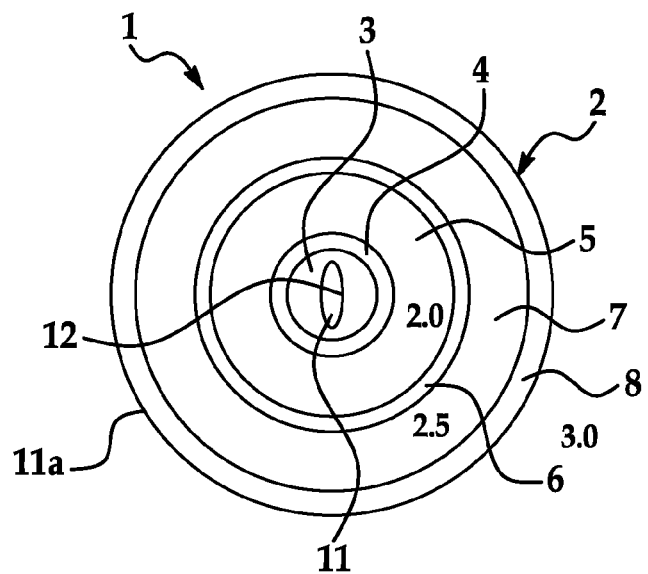
FIG. 17A is a top view of a repair patch according to an illustrative embodiment of the discretely-tailored multi-zone bondline for structural repair.
Figure 17B:
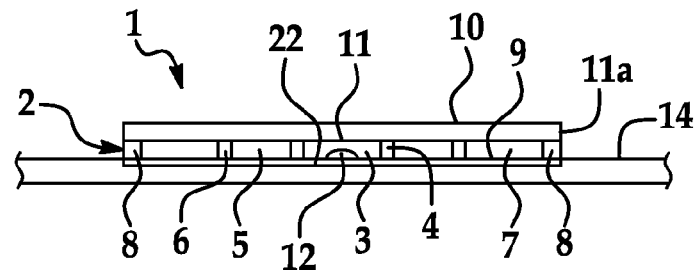
FIG. 17B is a side view of the repair patch according to an illustrative embodiment of the discretely-tailored multi-zone bondline for structural repair.
Figure 17C:
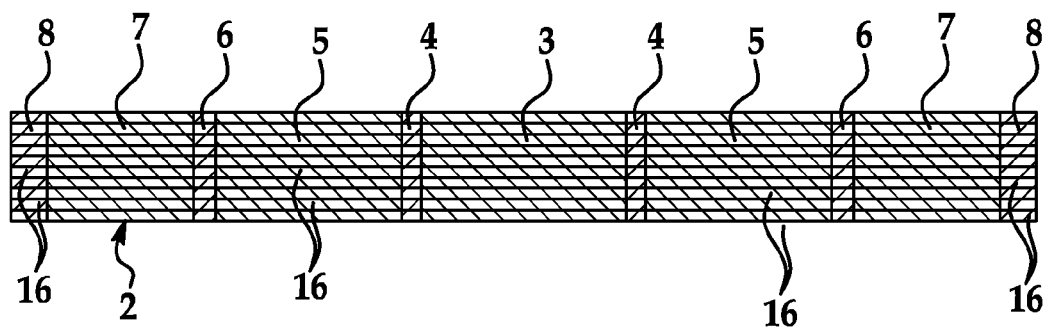
FIG. 17C is a cross-sectional view of a patch body of the repair patch according to an illustrative embodiment of the discretely-tailored multi-zone bondline for structural repair, more particularly illustrating a multiply construction of the patch body.

Referring to FIGS. 17A-17C, a repair patch 1 according to an illustrative embodiment of the discretely-tailored multi-zone bondline for structural repair is shown. The repair patch 1 may include a patch body 2. An overlay doubler 10 may be provided on the patch body 2. The patch body 2 may include multiple, concentric patch regions which progressively increase in interlaminar fracture toughness from the center 11 to the edge 11a of the patch body 2. In some embodiments, the patch body 2 may include an inner patch region 3; a middle patch region 5; and an outer patch region 7, as shown. In other embodiments, the patch body 2 may have a greater or lesser number of concentric patch regions.

Concentric separation zones may separate the patch regions from each other in the patch body 2. In some embodiments, an interior separation zone 4 may separate the middle patch region 5 from the inner patch region 3; a middle separation zone 6 may separate the outer patch region 7 from the middle patch region 5; and an outer separation zone 8 may circumscribe the outer patch region 7. In other embodiments, the patch body 2 may have a greater or lesser number of separation zones depending on the number of patch regions in the patch body 2.

In exemplary application of the repair patch 1, which will be hereinafter described, the patch body 2 of the repair patch 1 is bonded over an inconsistent area 22 on a repair surface 14, which may be a composite material, using a suitable adhesive 9 (FIG. 17B). The patch body 2 may be sized and configured to cover the inconsistent area 22 on the repair surface 14. Each patch region 3, 5, 7 of the patch body 2 may have the ability to contain and localize a disbond 12 which inadvertently forms between the repair patch body 2 and the repair surface 14 after the repair patch 1 is bonded to the repair surface 14. Each separation zone 4, 6, 8 of the patch body 2 may diffuse disbond energy to further retard enlargement of the disbond between the patch body 2 and the repair surface 14. Each patch region 3, 5, 7 and each separation zone 4, 6, 8 of the patch body 2 may have a unique mechanical/material functional high-interlaminar properties that are specifically designed into the repair patch configuration to prevent "unzipping" of the patch bondline that may otherwise occur due to hoop stresses, unsymmetrical wing bending, high peak shear stresses, shear-induced buckling and other fuselage-loading conditions. The separation zones 4, 6, 8 may complement minimization of adhesive stresses in the bondline to contain and resist damage growth even in thick wing composite structures.

As shown in FIG. 17C, each of the patch regions 3, 5, 7 and each of the separation zones 4, 6, 8 may be fabricated using multiple plies 16 of fiber reinforced polymer in which the plies 16 may be tailored in order to aid in achieving patch regions 3, 5, 7 and separation zones 4, 6, 8, respectively, having the desired interlaminar fracture toughness. The interlaminar fracture toughness within the patch body 2 may be tailored within the patch regions 3, 5, 7 and the separation zones 4, 6, 8 by selecting and/or arranging the plies 16 such that the plies in each of the patch regions 3, 5, 7 and each of the separation zones 4, 6, 8 have different characteristics. In other words, each of the patch regions 3, 5, 7 and each of the separation zones 4, 6, 8 may have ply characteristics that are unique to that region. As used herein, "characteristics" and "ply characteristics" refer to, without limitation: the type, size or quantity of fiber reinforcement in a ply 16; ply thickness; gaps between the plies 16; materials, elements or structures placed between the plies 16; the number of plies 16; the type or density of matrix used in the ply 16; the layup orientation (angle) of each ply 16 and/or the sequence of ply orientations in a stack of the plies 16.

In the patch body 2, the inner patch region 3, the inner separation zone 4, the middle patch region 5, the middle separation zone 6, the outer patch region 7 and the outer separation zone 8 may have different levels of interlaminar fracture toughness, which may progressively increase from the inner patch region 3 to the outer separation zone 8. Accordingly, the inner patch region 3 may have the lowest interlaminar fracture toughness value whereas the outer separation zone 8 may have the highest interlaminar fracture toughness value.

In some embodiments, each of the separation zones 4, 6, 8 may have a variable Mode 1 interlaminar fracture toughness with a minimum fracture toughness ($G_{1C}$) of about 2.0 in-#/in$^2$. In some embodiments, the interlaminar fracture toughness of each separation zone 4, 6, 8 will be slightly higher than that of the inner patch region 3. The inner separation zone 4 may have a $G_{1C}$ of about 2.0 in-#/in$^2$; the middle separation zone 6 may have a $G_{1C}$ of about 2.5 in-#/in$^2$; and the outer separation zone 8 may have a $G_{1C}$ of about 3.0 in-#/in$^2$. The inner patch region 3 may have a $G_{1C}$ of less than about 2.0 in-#/in$^2$; the middle patch region 5 may have a $G_{1C}$ of between about 2.0 in-#/in$^2$ and about 2.5 in-#/in$^2$; and the outer patch region 7 may have a $G_{1C}$ of between about 2.5 in-#/in$^2$ and about 3.0 in-#/in$^2$.

In exemplary application of the repair patch 1, the patch body 2 is applied to an inconsistent area 22 on a repair surface 14 which may be a composite material structure such as a wing panel (not shown) of an aircraft, for example and without limitation. A commercially-available adhesive 9 which may be an adhesive tape or adhesive paste, for example and without limitation, may be used to bond the patch body 2 to the repair surface 14.

Various stresses such as in-plane shear stresses as well as out-of-plane bending and buckling stresses, for example and without limitation, may be applied to the repair surface 14. Accordingly, a disbond crack 12 may inadvertently form in the inner patch region 3 at the patch body center 11 of the patch body 2. As the applied load on the repair surface 14 increases, the disbond crack 12 may propagate outwardly. As the disbond crack 12 approaches the middle patch region 5, the live total strain energy release rate may first be diffused at the inner separation zone 4 which may have a higher interlaminar fracture toughness value ($G_{1C}$) than the inner patch region 3. Therefore, the growth of the disbond crack 12 may be slowed down or completely retarded as it enters the middle patch region 5.

The middle patch region 5 functions as a disbond crack depository as it reduces the local peak shear and peel stresses to a level that is effectively benign. At this level, the repair patch 1 may be able to react to any mid-span out-of-plane deformation due to change in stiffness between the repair surface 14 and the repair patch 1. As the applied load continues to increase (and assuming the disbond crack 12 begins to grow again), the middle separation zone 6 may act as a second disbond crack depository since it may have an even higher interlaminar fracture toughness value ($G_{1C}$) than the inner separation zone 5 and the middle patch region 5, thereby mitigating the shear-lag effects that may otherwise occur in the traditional bonded repair close to the patch boundary edge.

The descrete separation zones 4, 6, 8 of the patch body 2 of the repair patch 1 may have progressively higher interlaminar fracture toughness which provides a gradual but effective progressive retardation of multiple disbonds emanating from the center or the edge of the repair patch 1. This progressive retardation design may possess a series of self-arrestment by self-correcting the total strain energy release rate at the disbond tip. The multiple self-arrestment separation zones may also play a critical role in redistributing the load regardless of the stacking sequences in the patch design. The unique ability inherent in this design may mitigate the crack tip forces for any likely unzipping of the repair joint. In addition, the uniqueness of this higher-order separation zone design may also minimize the deleterious effects of critical Nz-type loads on the repair patch 1 due to non-symmetrical turbulences during flight. The result is an integrated fail-safe bonded repair design that provides a gradual reduction of the interlaminar stress at each main zonal boundary regardless of any hard point, thermal and stiffness mismatches.

The multi-separation-zoned design of the repair patch 1 may act independently as a secondary fail-safe mechanism for either a longitudinal or a transverse disbond crack or a discrete-type damage in a composite, metallic or hybrid structural material aircraft. The multiple fail-safe patch design of the repair patch 1 may be used under most loading conditions whether they are developed under hoop or skin in-plane shear stresses in the fuselage structure due to pressurization loads, including up-and-down bending due to lateral gusts or maneuver loads. The stress singularities that develop at the tip of the disbond crack 12 may be drastically reduced. This may result in an effective and efficient patch design that retards disbond crack extension under both static and negative reversed fatigue loads. This, in turn, may exceed the damage tolerance and residual strength requirements beyond limit loads for bonded joint composite repair.

The repair patch 1 may have the capability to be categorized, fabricated, packaged and made available for field or factory use. This may include precutting and assembling the adhesive patch design into the required damage tolerance configuration for the required performance.

Figure 17D:
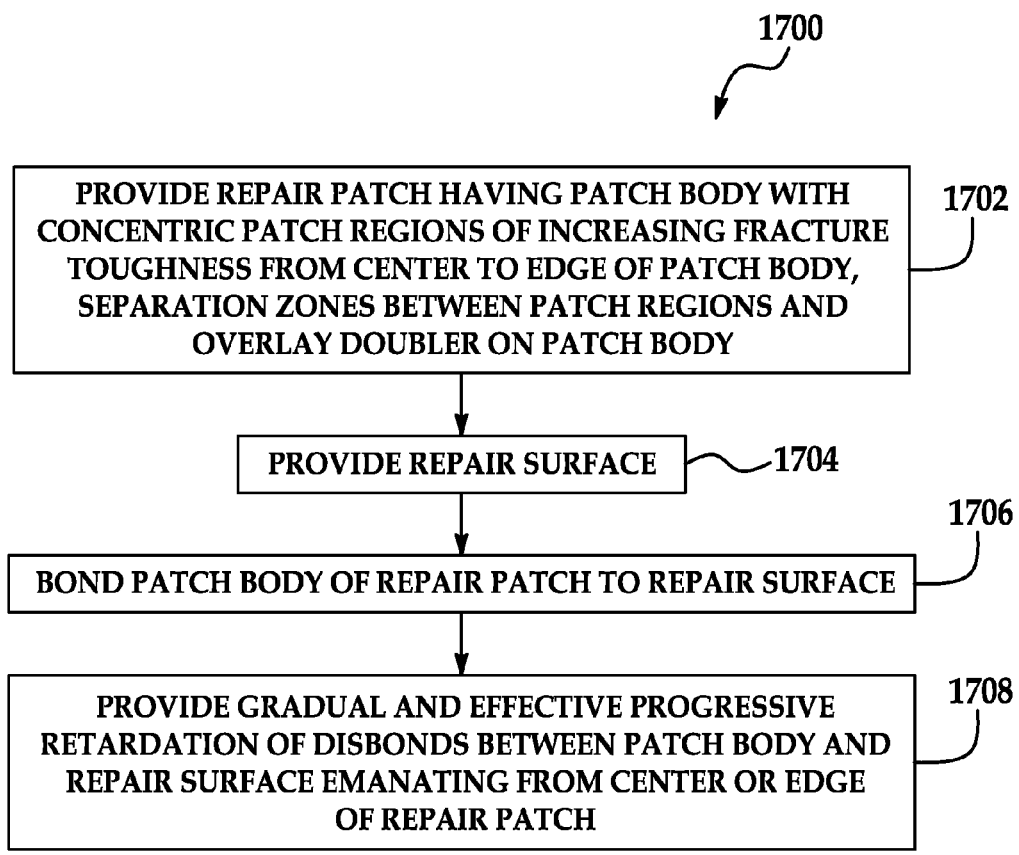
FIG. 17D is a flow diagram which illustrates an exemplary method of repairing a repair surface using a repair patch according to an illustrative embodiment of the discretely-tailored multi-zone bondline for structural repair.

Referring next to FIG. 17D, a flow diagram 1700 which illustrates an exemplary method of repairing a repair surface using a repair patch according to an illustrative embodiment of the discretely-tailored multi-zone bondline for structural repair is shown. In block 1702, a repair patch having a patch body is provided. The patch body of the repair patch may include concentric patch regions of increasing interlaminar fracture toughness from the center to the edge of the patch body. Separation zones may be provided between the patch regions. An overlay doubler may be provided on the patch body. In block 1704, a repair surface is provided. In block 1706, the patch body of the repair patch is bonded to the repair surface. In block 1708, the patch regions and separation zones may provided gradual and effective progressive retardation of disbonds between the patch body and the repair surface emanating from the center or the edge of the repair patch.

Figure 18:
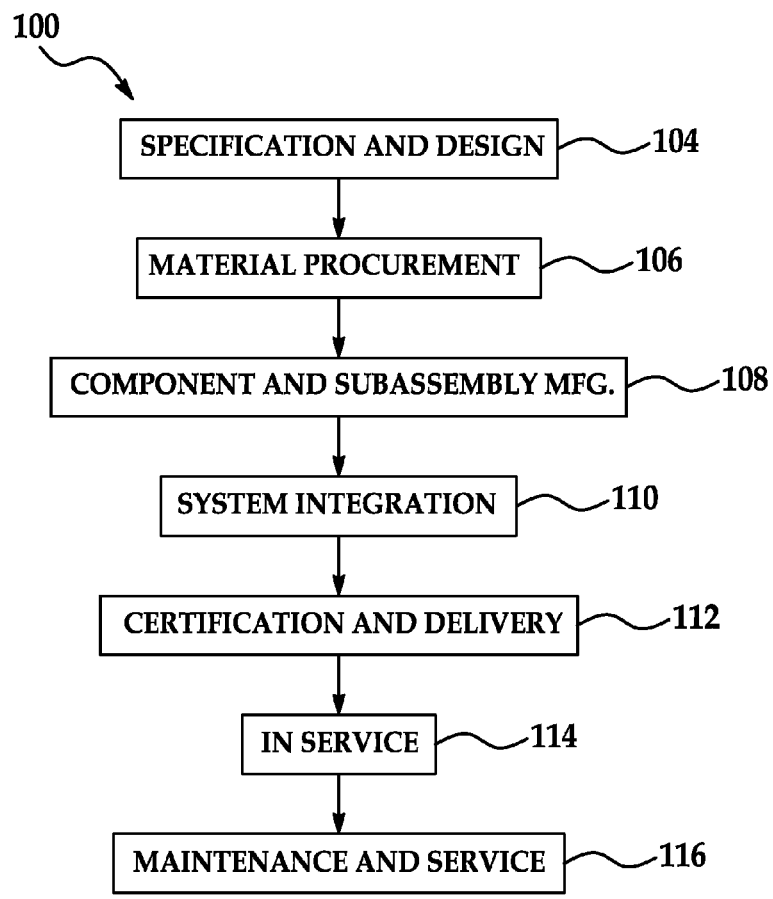
FIG. 18 is an illustration of a flow diagram of aircraft production and service methodology.
Figure 19:
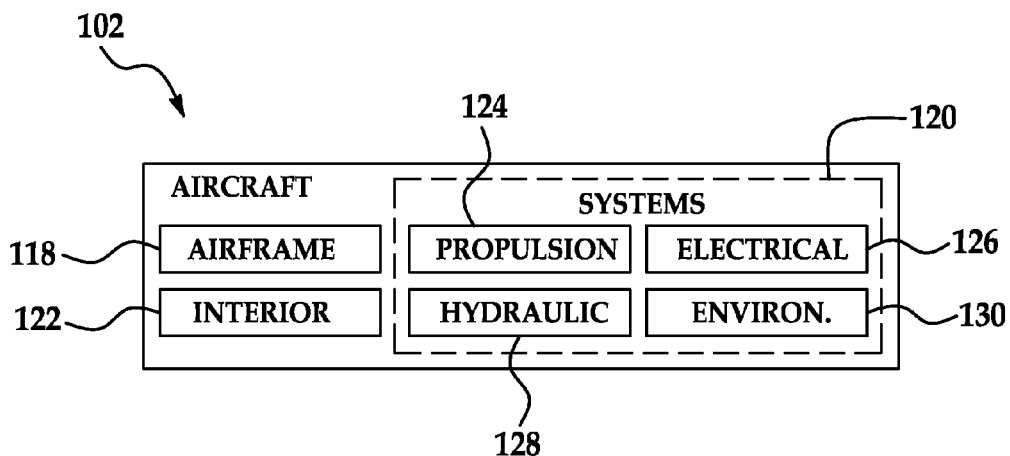
FIG. 19 is an illustration of a block diagram of an aircraft.

Embodiments of the disclosure may find use in a variety of potential applications, particularly in the transportation industry, including for example, aerospace, marine and automotive applications. Thus, referring now to FIGS. 18 and 19, embodiments of the disclosure may be used in the context of an aircraft manufacturing and service method 100 as shown in FIG. 18 and an aircraft 102 as shown in FIG. 19. During pre-production, exemplary method 100 may include specification and design 104 of the aircraft 102 and material procurement 106. The rework patches 30 may be specified and designed as part of the specification and design 104 of the aircraft 102, and procured as part of the procurement process 106.

During production, component and subassembly manufacturing 108 and system integration 110 of the aircraft 102 takes place. The patches 30 may be used during production to rework inconsistencies that occur during the manufacturing 108 and/or system integration 110. Thereafter, the aircraft 102 may go through certification and delivery 112 in order to be placed in service 114. The patches 30 may be used to rework inconsistencies in order to achieve certification of the aircraft 102 and/or to satisfy delivery requirements. While in service by a customer, the aircraft 102 is scheduled for routine maintenance and service 116 (which may also include modification, reconfiguration, refurbishment, and so on). The patches 30 may be used while the aircraft 102 is in service to rework areas of the aircraft 102 that may develop inconsistencies while in service, and the condition of the patches 30 may be checked as part of a periodic maintenance routine.

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 102 produced by exemplary method 100 may include an airframe 118 with a plurality of systems 120 and an interior 122. The patches 30 may be used to rework inconsistencies in the airframe 118. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the marine and automotive industries.

Systems and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A repair patch for reworking an inconsistent area of a composite structure, comprising:
   a patch body adapted to cover the inconsistent area and having a first patch region, a second patch region outside the first patch region and a first separation zone between the first patch region and the second patch region, with the first patch region, the first separation zone and the second patch region having increasing interlaminar fracture toughness from a center to an edge of the patch body, the first separation zone and the second patch region being substantially concentric rings surrounding the first patch region, the first patch region being centrally located relative to the first separation zone and the second patch region; and
   a layer of adhesive for bonding the patch body to the composite structure.

2. The repair patch of claim 1 wherein said patch body includes a plurality of fiber reinforced composite laminate plies each having a fiber orientation and a first portion of the plurality of plies in said first patch region possesses characteristics that are different from a second portion of the plurality of plies in said second patch region.

3. The repair patch of claim 2 wherein said characteristics include at least one of a characteristic of the fibers, a thickness of the plurality of plies, the number of the plies in the plurality of plies, a presence of a gap between the plurality of plies, a fiber orientation of the plurality of plies, and a sequence of the fiber orientations of the plurality of plies in the patch region.

4. The repair patch of claim 1 further comprising a third patch region outside the second patch region.

5. The repair patch of claim 4 further comprising a second separation zone between the second patch region and the third patch region.

6. The repair patch of claim 4 wherein the first separation zone has a first interlaminar fracture toughness value of at least about 2.0 in-#/in$^2$.

7. The repair patch of claim 6 wherein the second separation zone has a second interlaminar fracture toughness value of at least about 2.5 in-#/in$^2$.

8. The repair patch of claim 7 further comprising:
   a third separation zone circumscribing the third patch region, wherein the third separation zone has a third interlaminar fracture toughness value of at least about 3.0 in-#/in$^2$.

9. The repair patch of claim 1 wherein the first patch region, the first separation zone and the second patch region all share at least one common radial axis relative to the concentric rings.

10. A repair patch for reworking an inconsistent area of a composite structure, comprising:
    a patch body adapted to cover the inconsistent area and having a first patch region, a first separation zone outside the first patch region, a second patch region outside the first separation zone, a second separation zone outside the second patch region, a third patch region outside the second separation zone and a third separation zone outside the third patch region, with the first patch region, the first separation zone, the second patch region, the second separation zone, the third patch region and the third separation zone having increasing interlaminar fracture toughness from a center to an edge of the patch body, and the first separation zone, the second patch region, the second separation zone, the third patch region, and the third separation zone all being substantially concentric rings surrounding the first patch region, the first patch region being centrally located relative to all of the first separation zone, the second patch region, the second separation zone, the third patch region, and the third separation zone; and a layer of adhesive for bonding the patch body to the composite structure.

11. The repair patch of claim 10 wherein the patch body includes a plurality of fiber reinforced composite laminate plies each having a fiber orientation and wherein a first portion of the plurality of plies in the first patch region, a second portion of the plurality of plies in the first separation zone, a third portion of the plurality of plies in the second patch region, a fourth portion of the plurality of plies in the second separation zone, a fifth portion of the plurality of plies in the third patch region, and a sixth portion of the plurality of plies in the third separation zone each possess characteristics that are different from each other.

12. The repair patch of claim 11 wherein said characteristics include at least one of a characteristic of the fibers, a thickness of the plurality of plies, a number of the plurality of plies, a presence of a gap between the plurality of plies, the fiber orientation of the plurality of plies, and a sequence of the fiber orientations of the plurality of plies in the patch region.

13. The repair patch of claim 10 wherein the first separation zone has a first interlaminar fracture toughness value of at least about 2.0 in-#/in$^2$.

14. The repair patch of claim 13 wherein the second separation zone has a second interlaminar fracture toughness value of at least about 2.5 in-#/in$^2$.

15. The repair patch of claim 14 wherein the third separation zone has a third interlaminar fracture toughness value of at least about 3.0 in-#/in$^2$.

16. The repair patch of claim 15 wherein the first patch region has a fourth interlaminar fracture toughness of less than about 2.0 in-#/in$^2$, the second patch region has a fifth interlaminar fracture toughness of about 2.0-2.5 in-#/in$^2$, and the third patch region has a sixth interlaminar fracture toughness of about 2.5-3.0 in-#/in$^2$.

17. The repair patch of claim 10 further comprising an overlay doubler on the patch body.

18. The repair patch of claim 10 wherein the first patch region, the first separation zone, the second patch region, the second separation zone, the third patch region, and the third separation zone all share at least one common radial axis relative to the concentric rings.

* * * * *